(12) United States Patent
Martin

(10) Patent No.: US 10,689,124 B2
(45) Date of Patent: Jun. 23, 2020

(54) ADJUSTABLE OFFSET MOUNT (AOM) FOR ENGINES OF MODEL AIRPLANES

(71) Applicant: Cedric P. Martin, San Diego, CA (US)

(72) Inventor: Cedric P. Martin, San Diego, CA (US)

( * ) Notice: Subject to any disclaimer, the term of this patent is extended or adjusted under 35 U.S.C. 154(b) by 105 days.

(21) Appl. No.: 15/998,818

(22) Filed: Aug. 16, 2018

(65) Prior Publication Data

US 2019/0055027 A1 Feb. 21, 2019

Related U.S. Application Data

(60) Provisional application No. 62/546,208, filed on Aug. 16, 2017.

(51) Int. Cl.
| | |
|---|---|
| *B64D 27/26* | (2006.01) |
| *A63H 27/00* | (2006.01) |
| *F02B 75/34* | (2006.01) |
| *B64D 27/04* | (2006.01) |

(52) U.S. Cl.
CPC ............ *B64D 27/26* (2013.01); *A63H 27/02* (2013.01); *B64D 27/04* (2013.01); *F02B 75/34* (2013.01); *B64D 2027/262* (2013.01)

(58) Field of Classification Search
CPC .. B64D 27/26; B64D 27/04; B64D 2027/262; A63H 27/102; F02B 75/34
See application file for complete search history.

(56) References Cited

U.S. PATENT DOCUMENTS

| | | | | |
|---|---|---|---|---|
| 2,234,758 | A * | 3/1941 | Goldberg | A63H 27/02 446/57 |
| 3,059,879 | A * | 10/1962 | Tatone | F02B 75/34 244/54 |
| 3,891,169 | A * | 6/1975 | Tremarco | F02B 75/34 248/554 |
| 4,108,401 | A | 8/1978 | Sullivan | |
| 4,222,280 | A | 9/1980 | Stewart | |
| 4,249,711 | A | 2/1981 | Godberson | |
| 4,771,968 | A * | 9/1988 | Perry | B64D 27/00 244/54 |
| 5,263,351 | A | 11/1993 | Berg, III | |
| 5,303,896 | A * | 4/1994 | Sterka | F02B 75/34 244/54 |
| 5,505,423 | A | 4/1996 | Kusijanovic | |
| 6,779,755 | B1 * | 8/2004 | Thomsen | A63H 27/02 244/54 |
| 2015/0102179 | A1 | 4/2015 | McHenry et al. | |
| 2019/0092484 | A1 * | 3/2019 | Whiteford | B64D 27/26 |
| 2019/0152615 | A1 * | 5/2019 | Combes | F02C 7/20 |

* cited by examiner

*Primary Examiner* — Anita M King
(74) *Attorney, Agent, or Firm* — Ritchison Law Offices, PC; John D Ritchison

(57) ABSTRACT

An Adjustable Offset Mount (AOM) device for engines of a model airplane which includes shim-less components with concave and convex components which are used to easily and accurately correct horizontal and vertical thrust angles.

13 Claims, 12 Drawing Sheets

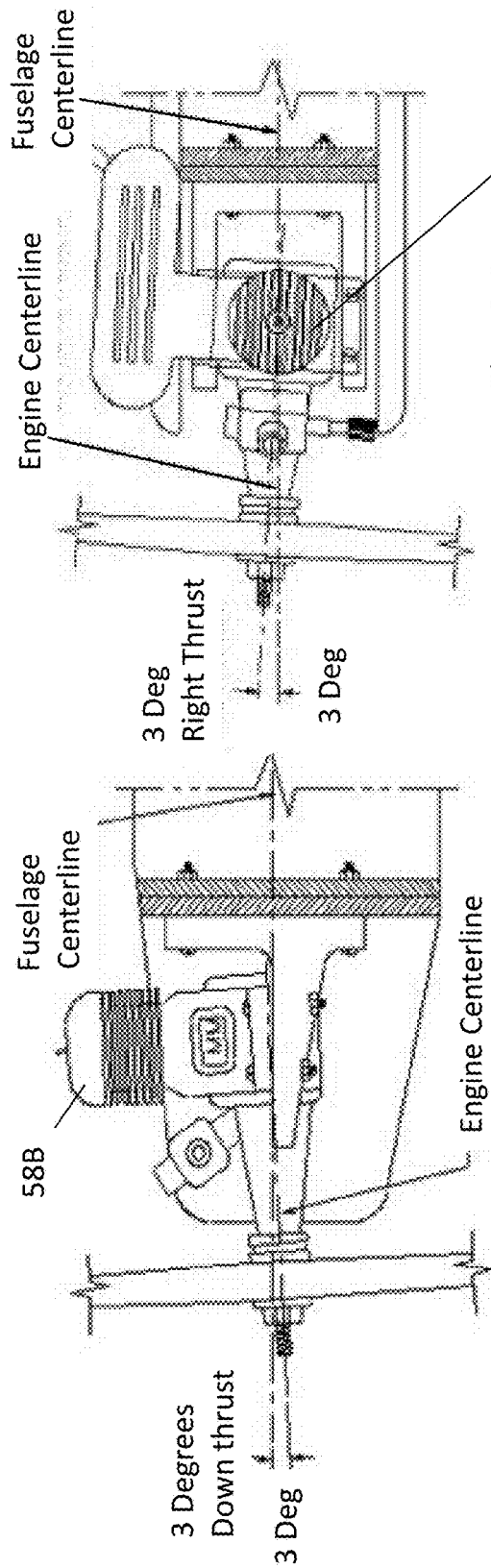
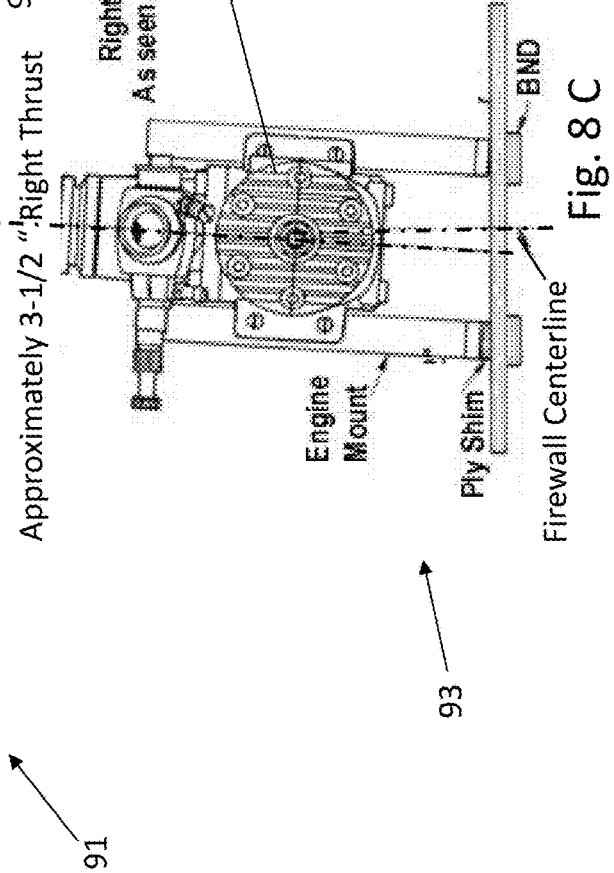
Fig. 8 A
Fig. 8 B
Fig. 8 C

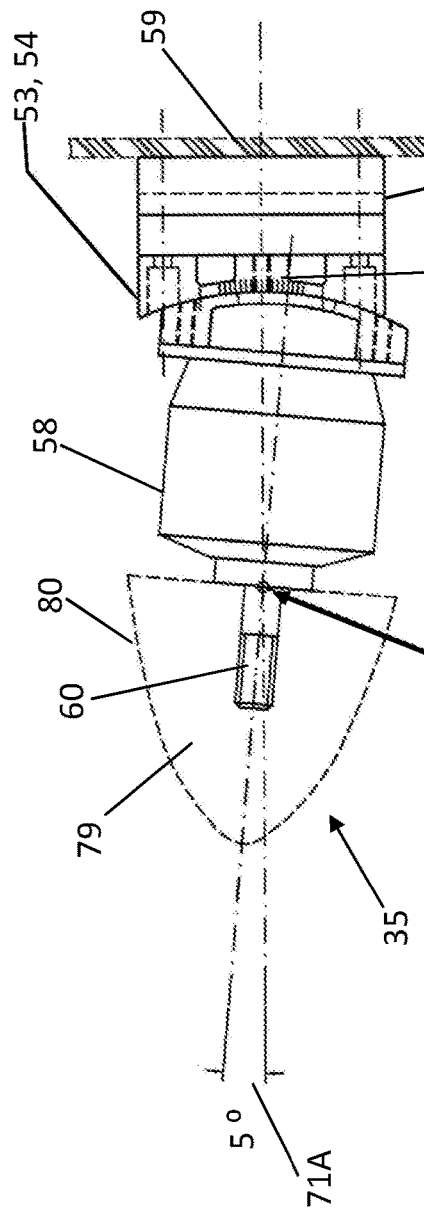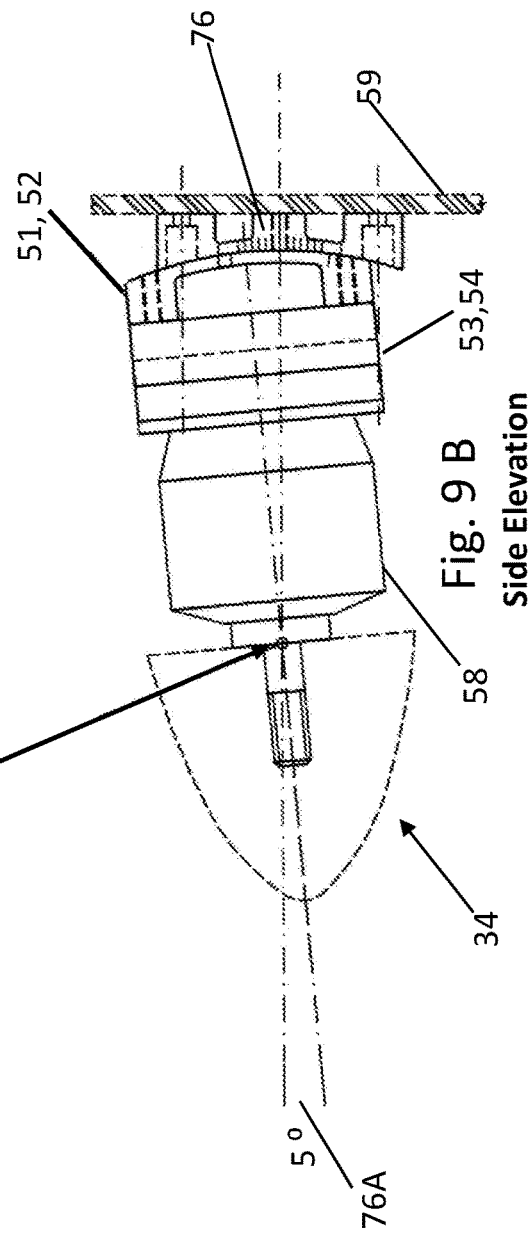
Fig. 9 A
Plan View
Fig. 9 B
Side Elevation
Note: Regardless of the Angle of Deflection, the center point of the spinner back plate always remains on the centerline of the airplane

6,779,755

4,249,711

5,505,423

ADJUSTABLE OFFSET MOUNT (AOM) FOR ENGINES OF MODEL AIRPLANES

CROSS-REFERENCE TO RELATED APPLICATIONS

This application claims the benefit of U.S. Provisional Patent Application with Ser. No. 62/546,208 filed Aug. 16, 2017, by Cedric P. Martin and entitled "Adjustable Offset Mount (AOM) for engines of model airplanes".

FIELD OF INVENTION

This invention relates to an Adjustable Offset Mount (AOM) for engines of model airplanes. The present invention relates to the mounting of motors to model airplanes and the like. It relates to engine mounts and, more particularly, to a selectively adjustable mount for intended use with a model airplane engine. A variety of methods and devices have heretofore been used to mount engines to model airplanes. The device of the present invention is designed specifically to eliminate the tedious and difficult adjustment steps necessary in the prior art, wherein small adjustments must be made, the flight tested, and repeated adjustments must be made until after a number of trials, appropriate alignment is achieved. The device of the present invention allows an easier, less time-consuming adjustment.

FEDERALLY SPONSORED RESEARCH

None.

SEQUENCE LISTING OR PROGRAM

None.

BACKGROUND

Field of Invention and Prior Art

As far a known, there are no other technical developments of concepts that employ or are configured with the unique design of this Adjustable Offset Mount (AOM) for engines of model airplanes.

Background

The building and operation of remote control boats, cars, and especially airplanes, is becoming an increasingly popular and complex hobby. Specifically, with regard to model airplanes, scaled models of real aircraft are increasingly advanced and effective. To meet these increasing needs, small scale model aircraft engines are manufactured in a variety of sizes and configurations adapted to provide high levels of performance and ability to the model airplane. Due to their high output nature, model aircraft engines often become worn or otherwise require replacement, repair or adjustment. When such a replacement of the model aircraft engine is necessary, a new engine cannot simply be purchased and immediately installed for effective use. Rather, once the new engine is mounted within the aircraft, its specific orientation within the aircraft must be continually adjusted until a proper orientation which provides the most effective flight is achieved. Similarly, this adjustment is necessary even if the old engine has merely been temporarily removed or repositioned from its appropriate orientation.

In one method, the engine is mounted directly to the firewall of an airplane. In another method, various mounts or spacers are utilized to mount the engine to the firewall. Engines mounted in accordance with the above methods generally are not readily interchangeable with other sized engines. Also, engines mounted in accordance with prior art methods are subject to excessive vibration. The use of prior art methods also does not permit the position of the engine to be readily adjusted.

Problems Solved

Presently, in order to facilitate interchanging and remounting of model aircraft engines, separate engine mounts are employed. Specifically, the engine is secured to the mount, and the mount rather than the engine itself is directly secured to the model airplane. These model airplane engine mounts presently include a plurality of openings disposed about a periphery thereof where through a screw is utilized to secure the mount to the fire wall of the model aircraft. Once installed, repeated testing and adjustment is undertaken to achieve the proper orientation of the engine. This testing requires continuous unfastening and refastening of the number of screws used to secure the mount to the fire wall in alternating sequences and with no accurate indications. Further, during this adjustment process, the tightening or loosening of one of the plurality of screws may result in a change in alignment which necessitates tightening or loosening of the remaining screws in a countless number of differing patterns and degrees. The device of the present invention is designed specifically to eliminate the tedious and difficult adjustment steps necessary in the prior art, wherein small adjustments must be made, the flight tested, and repeated adjustments must be made until after a number of trials, appropriate alignment is achieved. The device of the present invention allows an easier, less time-consuming adjustment.

In most cases, current motor mounts do not allow for offset adjustments. To achieve the desired offset angles with existing motor mounts, it is necessary to first calculate how much to shim the left side of the mount to give the desired right offset angle. Since a lot of models require down offset in addition to right offset, we must now determine how much additional shimming must be done to achieve the desired down offset angle also. The result of all this shimming means (looking at the motor from the front), that the top right corner of the mount will have the most shims, the top left and bottom right corners will have the same number of shims, but less than the top right corner, and the bottom left corner will have the least number of shims. That is of course, assuming that both the left, and down, offset angles are the same. If the offset angles differ, which is often the case, then the calculation of how many shims and where, gets a little more complicated. In addition, the motor mount now has to be moved bodily to the left, in order to bring the center of the spinner back plate back onto the centerline of the aircraft. This results in more calculations to determine how much to move the mount. R/C communities on the internet, show that people have not only used trigonometry, in an effort to calculate how much and where, but some have gone as far as to employ differential calculus. With the AOM, there is nothing to calculate. Simply undo the fasteners, and move the appropriate section of the mount the number of degrees required. With the AOM, trig and calculus are history. The days of lengthy calculations are gone forever.

A brief synopsis would be to say that: Certain factors, including propeller torque, prop wash, propeller P-factor and gyroscopic precession, all have an effect on the flying characteristics of both full size and model airplanes. In combination, they cause the airplane to turn to the left, while airplanes with a high wing, or bi-wing arrangement are also induced to climb. While the pilot of a full size airplane is typically expected to counter these forces, using the control inputs of the airplane, on a model airplane the engine is usually offset a few degrees to the right and a few degrees down to counter these forces.

PRIOR ART

For the Adjustable Offset Mount (AOM) for engines of model airplanes, a novelty search was accomplished. It revealed, as far as known, there are no Adjustable Offset Mount (AOM) for engines of model airplanes or the like. It is believed that this product is unique in its design and technologies.

A. A U.S. Patent Application No. 2015/0102179 was submitted by McHenry et al. in 2015 for a Bracket to mount aftercooler to engine. It discussed a bracket to mount an aftercooler to an engine with an engine block includes a base portion connected to the engine block and a mount portion to mount the aftercooler to the engine. A first Y-shaped portion and a second Y-shaped portion extend substantially parallel between the mount portion and the base portion, with a connecter portion structured there between. Both the first Y-shaped portion and the second Y-shaped portion include a base end that connects to the base portion, a mount end that connects to the mount portion, and a narrower mid-section. This configuration defines an arcuate profile from the base end to the mount end. A dimensional ratio between the narrower mid-section, the base end, and the mount end, is in a range of 1:1.5:4.4 to 1:1.7:4.6. Further, a dimensional ratio between the base end and a height from the base end to the mid-section is substantially 1:1.

B. A U.S. Pat. No. 6,779,755 by Thomsen was issued in 2004 for an Adjustable mount for a model airplane engine. Here is an adjustable mount for intended use with a model airplane engine is disclosed. The mount includes a bracket for supporting the engine and a base for connecting to the airplane, such as along the firewall. In one embodiment, the base includes a generally concave surface along one side that matches a generally convex surface along the corresponding side of the bracket. This arrangement allows the bracket to be moved relative to the base to change the orientation of an axis of rotation of the engine crankshaft with a position of one end of the shaft remaining substantially the same. A wedge assembly for fixing the position of the bracket relative to the base is also disclosed.

C. A U.S. Pat. No. 4,249,711 by Godbersen was issued in 1981 for Miniature airplane motor mounting structure. This invention relates to motor mounts in general, and more specifically to a universal motor mount to be employed in a model airplane, which will allow the motor to be disposed at any desired angle or altitude to accommodate engine or exhaust equipment beneath the engine cowling.

D. A U.S. Pat. No. 5,505,423 by Kusijanovic was issued in 1996 for Adjustable engine mount for a model airplane. It is an adjustable engine mount for use on a model airplane to supportably hold a model airplane engine, the engine mount including an adjustably positionable support bracket having a mount segment which is sandwichly positioned between a first mount panel and a second mount panel, the mount segment and the second mount panel each including an axial opening extending therethrough such that an elongate axial screw which extends from the first mount panel may pass therethrough to enable secured adjustable, single step securing of the mount segment, and accordingly the support bracket, in a selected secured orientation therebetween, thereby aligning the engine disposed on the support bracket in a desired orientation within the model airplane.

E. A. U.S. Pat. No. 5,263,351 by Berg, III was issued in 1993 for Locking wedge assembly for two-piece mechanically connected mandrels. It is a two-piece, mechanically connected mandrel assembly in which a locking wedge assembly serves to secure a tapered socket connection. The wedge assembly includes two long wedge segments, two short wedge segments, a bolt connecting the short wedge segments and a locking device to fix the bolt after proper torqueing to secure the assembly. The two-piece, mechanically connected mandrel assembly is useful in the rolling or drawing of steel tubing or other metal constructs, and the four-piece locking wedge assembly both provides a secure connection and permits ready replacement of a worn work bar with a new work bar.

F. A U.S. Pat. No. 4,222,280 by Stewart was issued in 1980 for Speed charging unit construction. This shows a speed changing unit preferably for use on a model aircraft or powered foot-launched aircraft. A usual engine is mounted on a frame which in turn is adapted to be mounted on the frame of an aircraft. A pair of pulleys are mounted on the frame in a spaced relationship with a drive belt drivingly interconnecting the pulleys. One of the pulleys is mounted on the drive shaft of the engine for positive rotation with the drive shaft. The other pulley is rotatably mounted on a stationary eccentric shaft which is adjustably mounted on the frame. A propeller is mounted directly on this other pulley for rotation therewith when driven by the engine drive shaft and belt. Manual rotation of the eccentric shaft within its mounting adjusts the spacing between the spaced pulleys permitting different size drive shaft pulleys to be used with a standard drive belt to achieve different propeller speeds and thrust characteristics for a particular aircraft.

G. A U.S. Pat. No. 4,108,401 by Sullivan was issued in 1978 for Motor mount for use in model airplane. It demonstrates a motor mount for use in model airplanes is disclosed. The motor mount includes a mounting plate and a pair of spaced arms extending generally perpendicularly from the mounting plate. Each arm includes a generally horizontal surface for supporting flanges of a motor or engine and an angled surface spaced above and sloping toward the horizontal surface. A clamping plate is secured to each of the angled surfaces. Each clamping plate secures a flange of the motor to one of said horizontal surfaces. The clamping plates can be secured to one of a plurality of locations along the longitudinal dimension of each arm.

SUMMARY OF THE INVENTION

This invention is an Adjustable Offset Mount (AOM) for engines of model airplanes. The object of the AOM, is to allow the engine mounting system to be attached to the firewall of the model airplane so that the centerline of the electric motor/glow fuel powered engine/gas powered engine, is directly on the centerline of the airplane, without any deviation, horizontally or vertically. Once attached to the firewall in this manner, the AOM then allows horizontal and vertical thrust angle offsets to be "dialed in", keeping the center point of the propeller mounting face, and therefore the center point of the spinner back plate, on the centerline of the airplane at all times. Accommodation is made, via graduations on the AOM, to adjust the offset angles in one degree increments. As stated, each engine mount is designed to accommodate a variety of engine sizes. Once the AOM is installed in this manner, loosening two socket head cap screws, adjusting the thrust angle and tightening them back up is all that is required. With the use of the correct adapter, most types of model airplane engine can be mounted to the airplane using the AOM.

The preferred embodiment of an Adjustable Offset Mount (AOM) is a shim-less and an Adjustable Offset Mount (AOM) device for engines of a model airplane, the device is comprised of: (a) a vertical angle base component and a vertical angle adjustment component with adjustment slots, a means to secure the vertical adjustment component in a pre-determined angle to the vertical angle base component wherein together the vertical base component and vertical angle adjustment component form a vertical adjustment section; (b) a horizontal angle base component and a horizontal angle adjustment component with adjustment slots, a means to secure the horizontal adjustment component in a pre-determined angle to the horizontal angle base component wherein together the horizontal base component and the horizontal angle adjustment component form a horizontal adjustment section; (c) a fastening means to connect the horizontal adjustment section to the vertical adjustment section and form the AOM device; (d) a means to connect the vertical adjustment section to a fuselage; and (e) a means to connect the horizontal adjustment section to a motor wherein the AOM device can be removably secured to a fuselage of the model airplane and readily adjusted to set the horizontal and vertical thrust angles of a propeller of the model airplane to easily correct flight direction and stabilize a flight pattern.

The newly invented Adjustable Offset Mount (AOM) for engines of model airplanes can be manufactured at low volumes by very simple means and in high volume production by more complex and controlled systems.

OBJECTS AND ADVANTAGES

There are several advantages of the Adjustable Offset Mount (AOM) for engines of model airplanes.
The device of the present invention is designed specifically to eliminate the tedious and difficult adjustment steps necessary in the prior art, wherein small adjustments must be made, the flight tested, and repeated adjustments must be made until after a number of trials, appropriate alignment is achieved. The device of the present invention allows an easier, less time-consuming adjustment. With the AOM, competition flyers (precision aerobatic flyers in particular), gain the advantage of quick and easy adjustment of the offset angles. This may be required to trim out their aircraft to achieve neutral flying and handling characteristics, so important in 'Pattern' flying. With existing motor mounts, this may be extremely difficult at best, and most likely impossible. Also, in the event that a motor change is required, a spare motor could be ready mounted on the AOM with the offset angles already dialed in. This would make for a very quick motor swap compared to what exists today. In addition, if the aircraft in question only needs right offset, with no down offset required, the components that make up the down offset adjustment can be removed, thereby saving weight and room inside the cowl. The advantages stated above, apply equally to both competition flyers and weekend sport flyers alike. In fact, the AOM is an advantage to anyone who wants the ease of installation and the flexibility that this motor mount provides. We at AOM see this mount as being useful to, and desired by, not only American flyers, but flyers in other countries, especially Europe. With four sizes of AOM, most motors are catered for, ranging from 35 mm electric motors, to electric motors the equivalent of 50 cc and 65 cc gas engines. By employing the use of commercially available static mounts, there is no reason why gas and glow motors could not avail themselves of all the advantages offered by the AOM.

It is not only desirable, but important to most model aircraft, that the aforementioned relationship between the center point of the spinner back plate and the center line of the aircraft be maintained. Not the least reason for this, is scale appearance, especially when competing in scale events which include static display. During a static display, a judge goes over every square inch of the model and measures for accuracy. A $\frac{1}{16}$" can mean the difference between a large trophy and a hand shake. The AOM keeps this relationship accurately at all times.

Finally, other advantages and additional features of the present Adjustable Offset Mount (AOM) for engines of model airplanes will be more apparent from the accompanying drawings and from the full description of the device. For one skilled in the art of model engine mounts for Radio Controlled (RC) engines, it is readily understood that the features shown in the examples with this product are readily adapted to other types of engine mount systems and devices.

DESCRIPTION OF THE DRAWINGS—FIGURES

The accompanying drawings, which are incorporated in and constitute a part of this specification, illustrate an embodiment of the Adjustable Offset Mount (AOM) for engines of model airplanes. The drawings together with the summary description given above and a detailed description given below serve to explain the principles of the Adjustable Offset Mount (AOM) for engines of model airplanes as a device for mounting and easily adjusting the mount for vertical and horizontal thrust. It is understood, however, that the AOM device is not limited to only the precise arrangements and instrumentalities shown.

FIGS. 1 A through 1 D are sketches of the general Adjustable Offset Mount (AOM) for engines of model airplanes.

Figure 4:
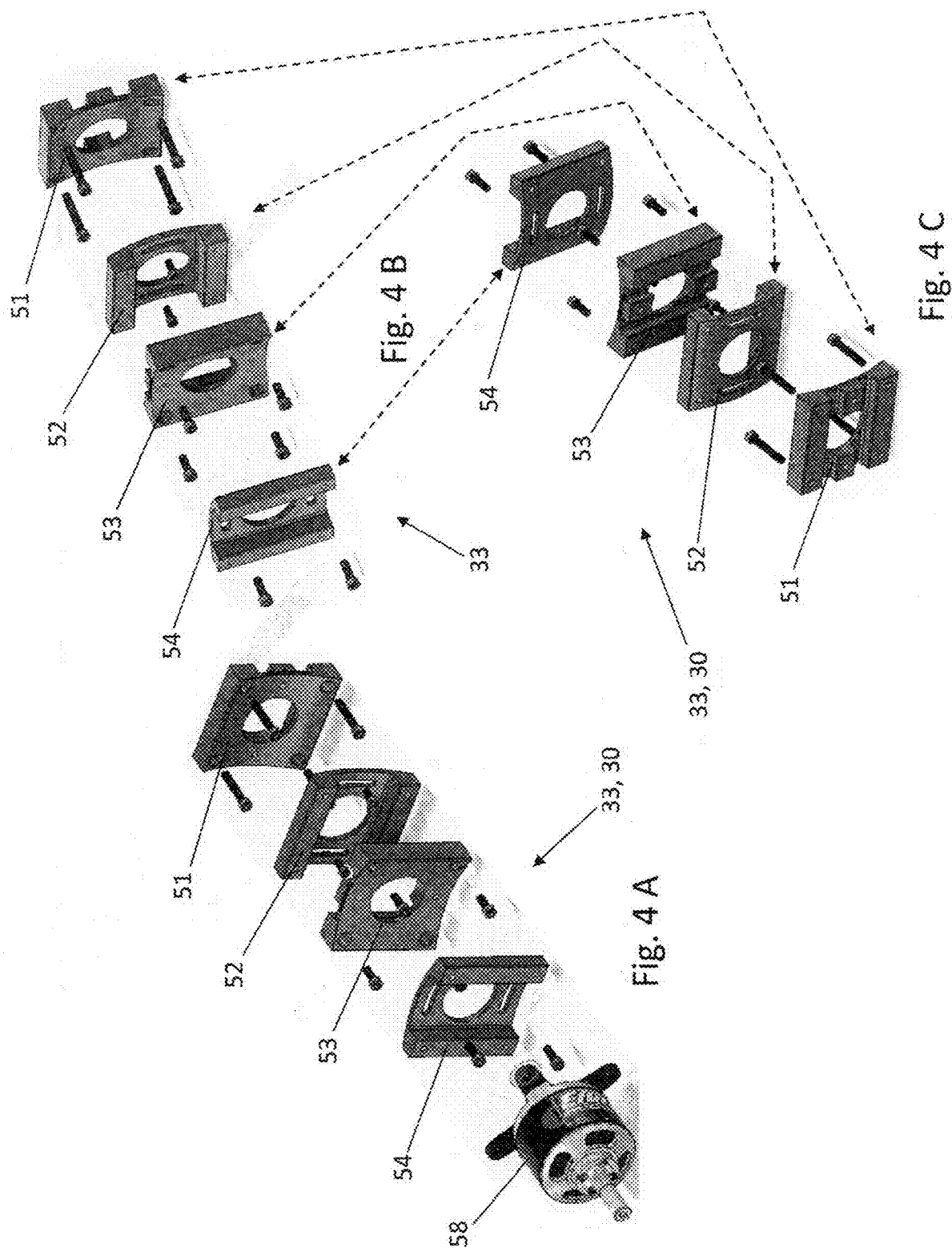

FIGS. 4 A through 4 C are even more sketches of the isometric assembly drawing of a prototype of the AOM.

Figure 5:
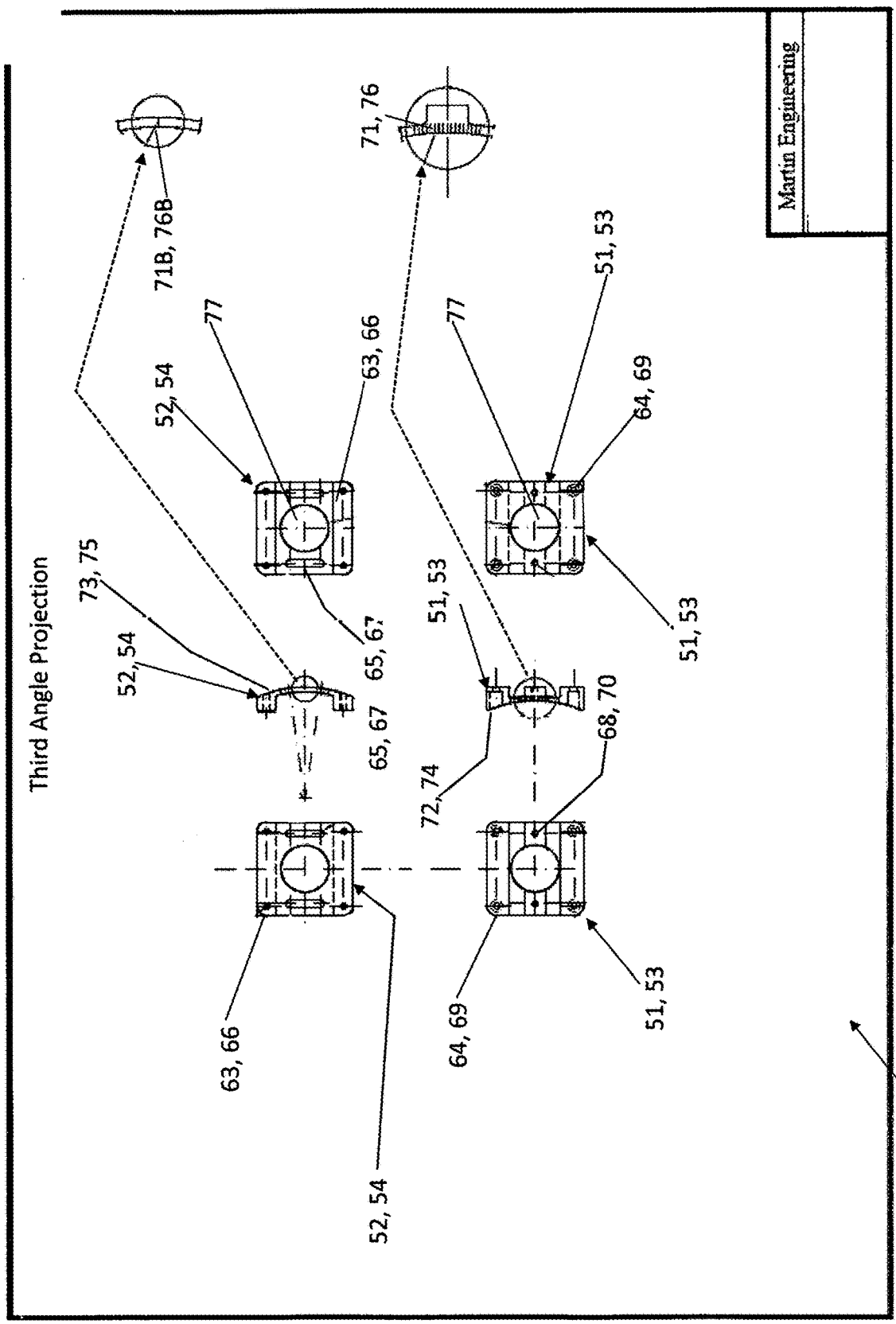
Figure 6:
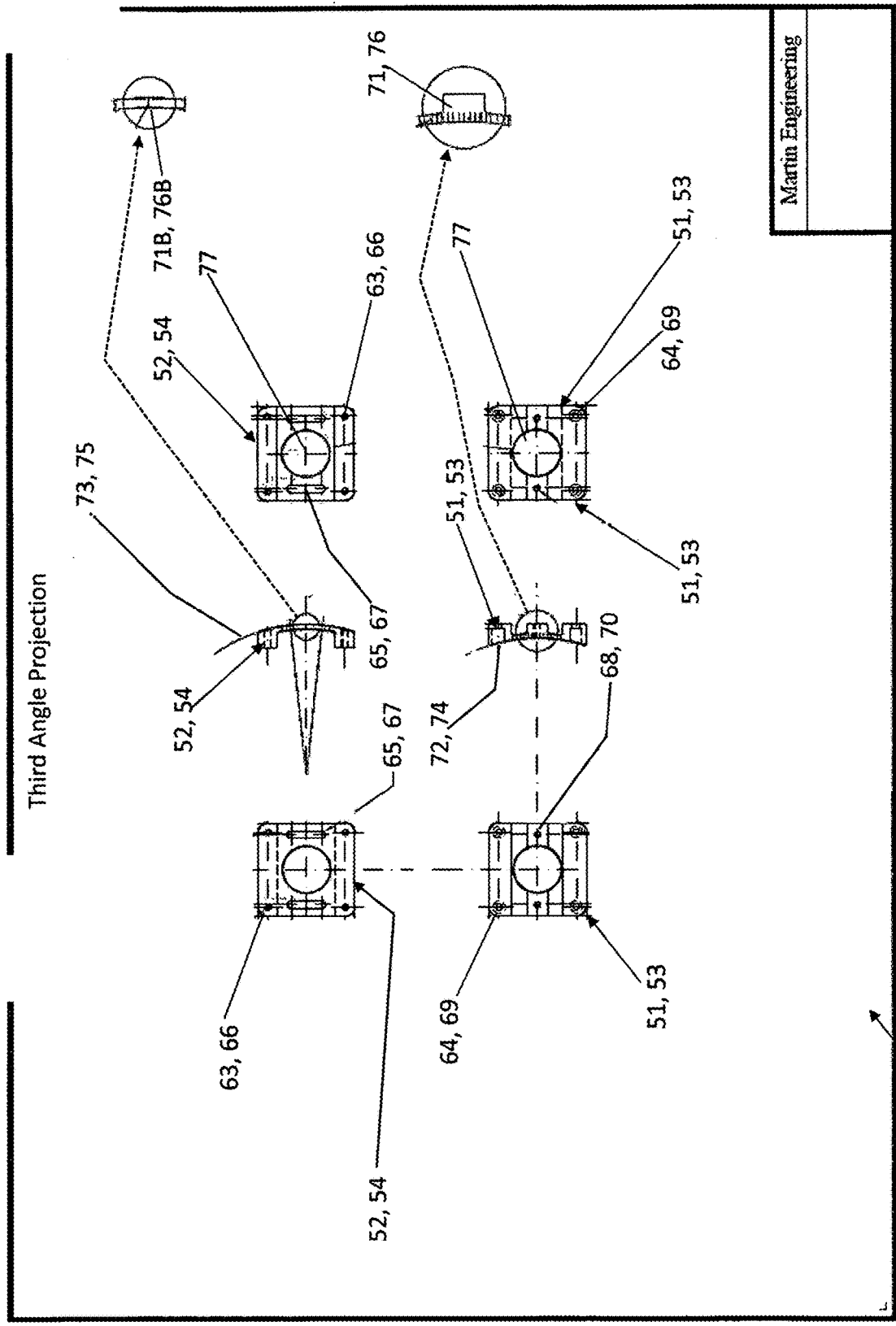

FIGS. 5 and 6 are each sketches of component parts drawings of an AOM with features denoted.

Figure 7:
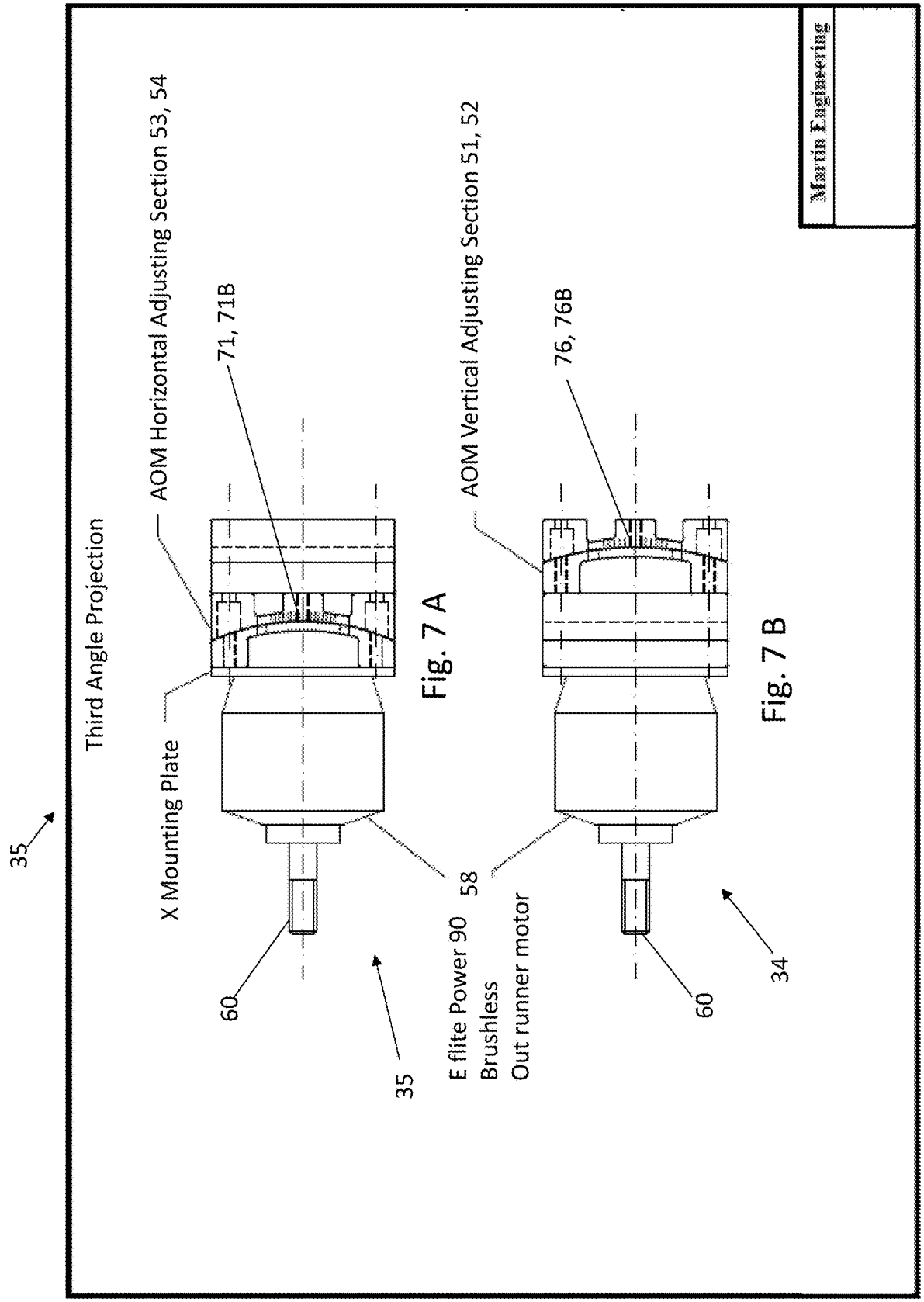

FIGS. 7 A and 7 B are third angle projections of an AOM from a top or plan view and a side or elevation view.

FIGS. 8 A through 8 C are three sketches to illustrate the problems associated with offsetting the engine relative to the centerline of the aircraft in both in horizontal and vertical directions.

FIGS. 9 A and 9 B are sketches of the benefits to the AOM when offsetting the engine relative to the centerline of the aircraft in both in horizontal and vertical direction.

Figure 10:
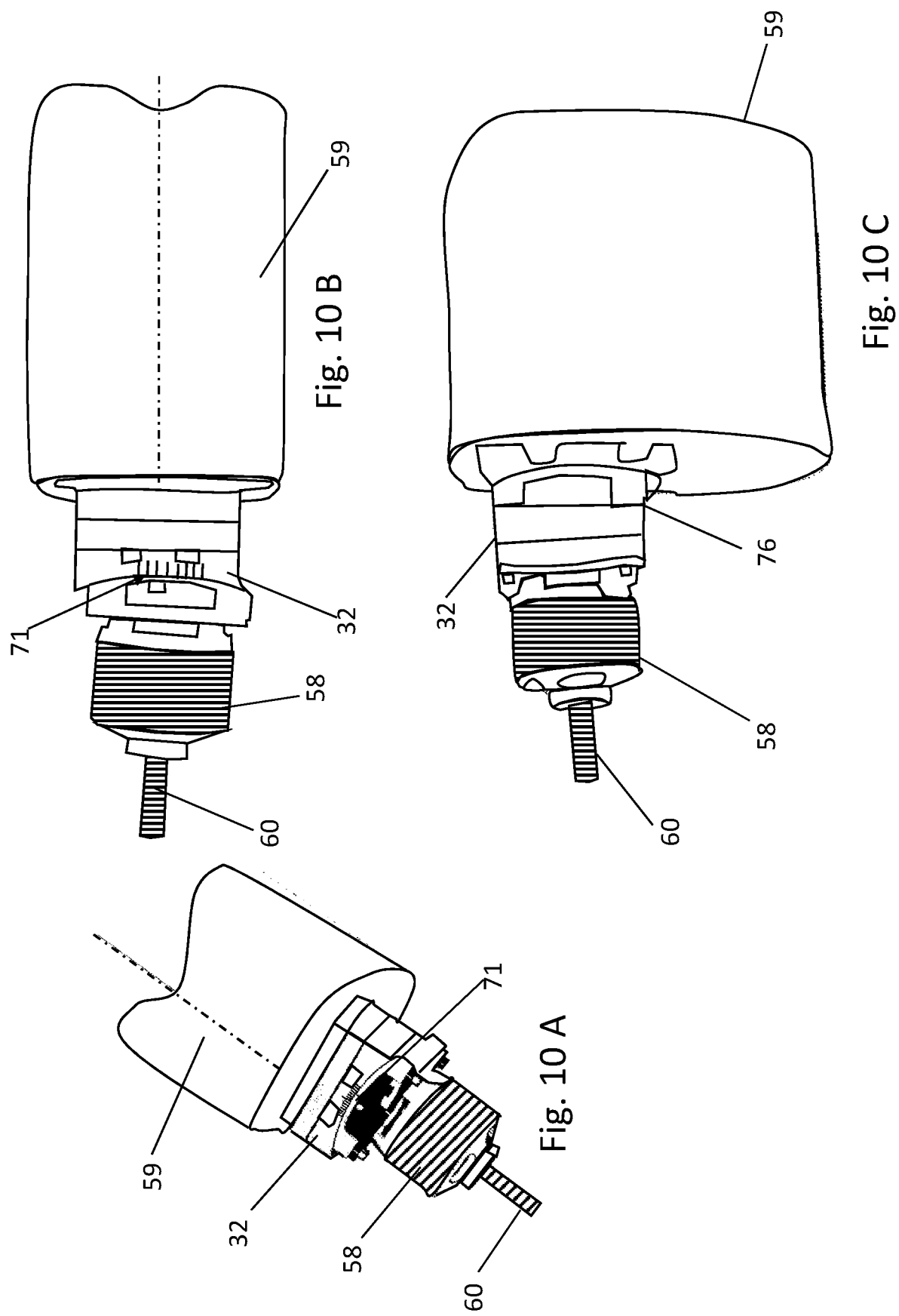

FIGS. 10 A through 10 C are sketches of prototype AOMs mounted to the fuselage and the motor of the model airplanes.

Figure 11:
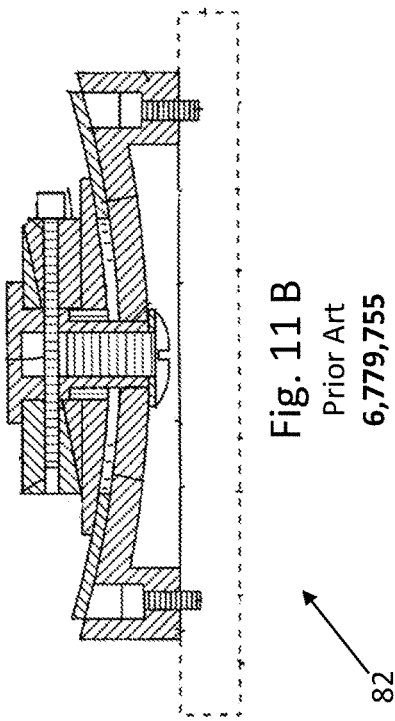
Figure 11:
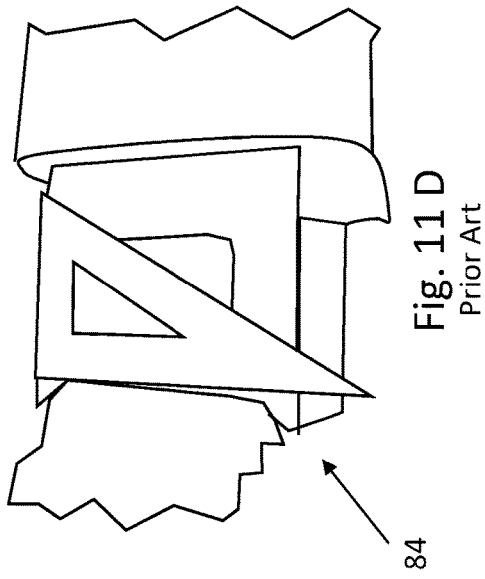
Figure 11:
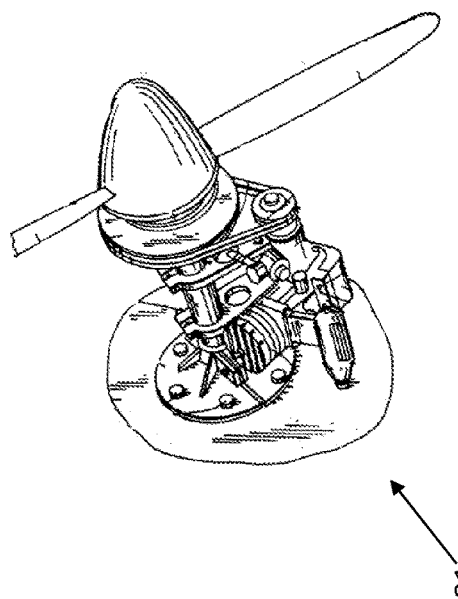
Figure 11:
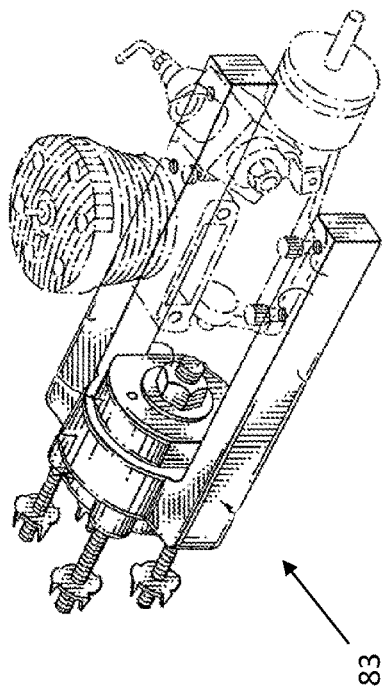
Figure 12:
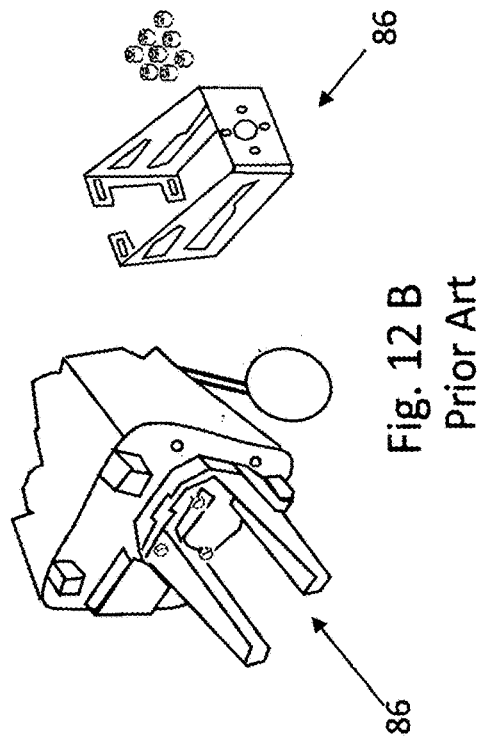
Figure 12:
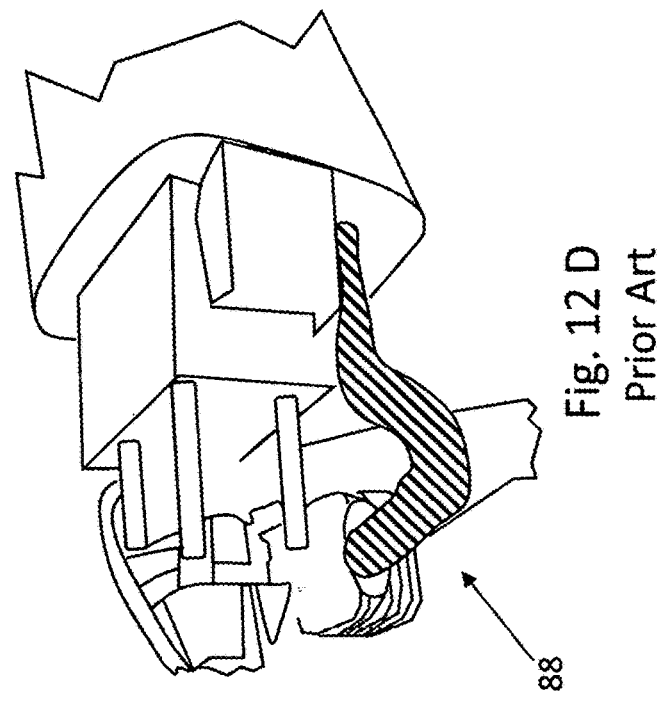
Figure 12:
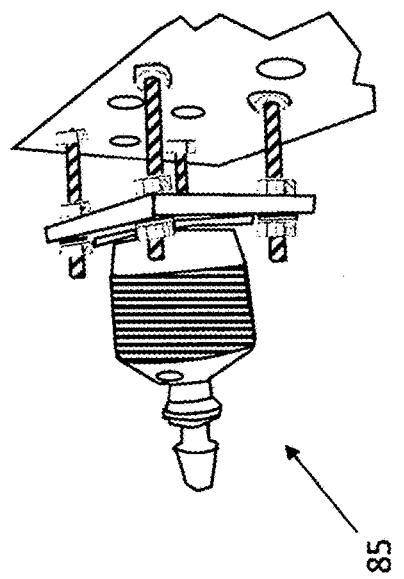
Figure 12:
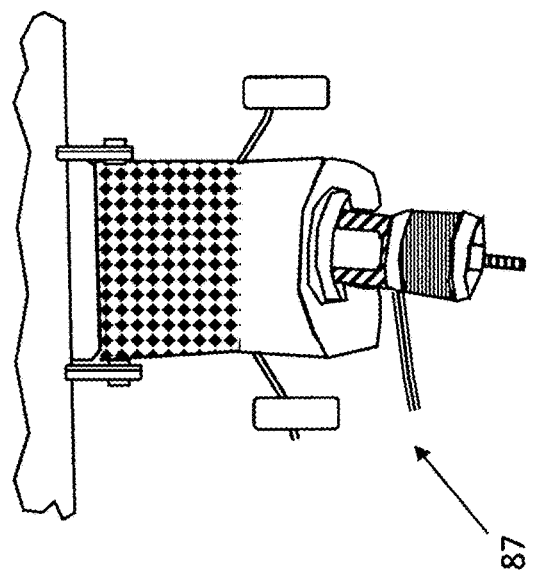

FIGS. 11 A through 11 D and FIGS. 12 A through 12 D are each sketches of prior art attempts to improve adjustable mountings for model airplanes.

DESCRIPTION OF THE DRAWINGS—REFERENCE NUMERALS

The following list refers to the drawings:

TABLE B

Reference numbers

| Ref # | Description |
|---|---|
| 30 | Adjustable Offset Mount (AOM) 30 for engines of model airplanes |
| 31 | exploded view 31 of Adjustable Offset Mount (AOM) 30 |
| 32 | prototype 32 of AOM 30 |
| 33 | isometric assembly drawing 33 of prototype 32 |
| 34 | side or elevation view 34 of AOM 30 |
| 35 | top or plan view 35 of AOM 30 |
| 36 | component part drawings 36 of parts 51, 52, 53, 54 |
| 51 | vertical angle base component 51 |
| 52 | vertical angle adjustment component 52 |
| 53 | horizontal angle base component 53 |
| 54 | horizontal angle adjustment component 54 |
| 55 | means for removably securing 55 vertical angle base component 51 to the fuselage bulkhead/firewall 59 - such as extended fasteners - bolts, socket head machine bolts, friction clips, rivets, cotter pin and key, pin and spring ball, hot glue, etc. |
| 56 | means for removably securing 56 vertical angle adjustment component 52 to the vertical angle base component 51 and means for removably securing 56A horizontal angle adjustment component 54 to the horizontal angle base component 53 -- such as socket head cap screws fasteners - bolts, socket head machine bolts, friction clips, rivets, cotter pin and key, pin and spring ball, hot glue, etc. |
| 57 | means for removably securing 57 horizontal angle base component 53, 54 to vertical angle adjustment component 51, 52 -- such as socket head cap screws fasteners - bolts, socket head machine bolts, friction clips, rivets, cotter pin and key, pin and spring ball, hot glue, etc. |
| 58 | power source 58 - for example, an electric motor 58A, gas engine 58B, glow fuel motor 58C, nitro engine, or diesel engine |
| 59 | fuselage bulkhead 59 |
| 60 | motor shaft 60 on engine 58 to mount propeller 80 |
| 61 | means for removably securing 61 motor 58 through motor base aperture 62 to horizontal angle adjustment component 54 at threaded apertures 63 of component 54 -- such as socket head cap screws fasteners - bolts, socket head machine bolts, friction clips, rivets, cotter pin and key, pin and spring ball, etc. |
| 62 | motor base aperture 62 |
| 63 | threaded apertures 63 of horizontal angle adjustment component 54 |
| 64 | recess aperture 64 of the horizontal angle base component 53, apertures oversized to accept means for removably securing 57 into the threaded apertures 66 of the vertical angle adjustment component 52 |
| 65 | essentially horizontal pair of slotted aperture 65 of horizontal angle adjustment component 54 for removably and adjustably securing means for removably securing 56 [horizontal angle adjustment component 54 to the horizontal angle base component 53], the means 56 entering into the threaded apertures 70 of the horizontal angle adjustment component 53 |
| 66 | threaded apertures 66 of vertical angle adjustment component 52 |
| 67 | essentially vertical pair of slotted aperture 67 of vertical angle adjustment component 52 for removably and adjustably securing means for removably securing 56 [vertical angle adjustment component 52 to the vertical angle base component 51], the means 56 entering into the threaded apertures 68 of the vertical angle base component 51 |
| 68 | threaded apertures 68 of the vertical angle base component 51 |
| 69 | recess aperture 69 of the vertical angle base component 51, apertures oversized to accept means for removably securing 55 into the threaded apertures of the fuselage bulkhead 59 |
| 70 | threaded apertures 70 of horizontal angle base component 53 |
| 71 | horizontal adjustment angle indicator 71 line scribed at zero (0) degrees to eight (8) degrees positive and negative adjustment indication |
| 71A | horizontal/right thrust adjustment angle 71A |
| 71B | line scribed 71B at zero (0) degrees base |
| 72 | concave curvature 72 on the vertical angle base component 51 |
| 73 | convex curvature 73 on the vertical angle adjustment component 52 |
| 74 | concave curvature 74 on the horizontal angle base component 53 |
| 75 | convex curvature 75 on the horizontal angle adjustment component 54 |
| 76 | vertical adjustment angle indicator 76 line scribed at zero (0) degrees to eight (8) degrees positive and negative adjustment indication |
| 76A | vertical/down thrust adjustment angle 76A |
| 76B | line scribed 76B at zero (0) degrees base |
| 77 | aperture 77 in each of AOM 30 base components 51, 53 and adjustable components 52, 53 to reduce weight of respective components |
| 79 | cowling 79 attached/integral over propeller 80 and shaft 60 |
| 80 | propeller/spinner 80 |
| 81 | prior art 81 is U.S. Pat. No. 4,249,711 |
| 82 | prior art 82 is U.S. Pat. No. 6,779,755 |
| 83 | prior art 83 is U.S. Pat. No. 5,505,423 |
| 84 | prior art 84 is an existing motor mount with a fixed adjustment "built in" |
| 85 | prior art 85 model motor on a 4 rod adjustment mount - awkward adjustment and no angle measurements |
| 86 | prior art 86 model motor with a bendable sheet metal mount (no control over adjustment size) |
| 87 | prior art 87 is a built in adjustment |
| 88 | prior art 88 is a model motor on a 4 rod adjustment mount with various sized spacers - again awkward adjustment and no angle measurements |
| 91 | down thrust/vertical mount adjustment 91 typical with shimming |
| 92 | side thrust/horizontal mount adjustment 92 typical with shimming |
| 93 | another side thrust/horizontal mount adjustment 93 typical with shimming |

DETAILED DESCRIPTION OF PREFERRED EMBODIMENT

The present development is an Adjustable Offset Mount (AOM) for engines of model airplanes device. The present invention relates to the mounting of motors to model airplanes and the like. It relates to engine mounts and, more particularly, to a selectively adjustable mount for intended use with a model airplane engine. A variety of methods and devices have heretofore been used to mount engines to model airplanes. The device of the present invention is designed specifically to eliminate the tedious and difficult adjustment steps necessary in the prior art, wherein small adjustments must be made, the flight tested, and repeated adjustments must be made until after a number of trials, appropriate alignment is achieved. The device of the present invention allows an easier, less time-consuming adjustment.

The advantages for the Adjustable Offset Mount (AOM) 30 for engines of model airplanes device are listed above in the introduction. These will be better understood once the description and operation are viewed.

The preferred embodiment of an Adjustable Offset Mount (AOM) is a shim-less and an Adjustable Offset Mount (AOM) device 30 for engines of a model airplane, the device is comprised of: (a) a vertical angle base component 51 and a vertical angle adjustment component 52 with adjustment slots, a means to secure the vertical adjustment component 52 in a pre-determined angle to the vertical angle base component 51 wherein together the vertical base component and vertical angle adjustment component form a vertical adjustment section 51,52; (b) a horizontal angle base component 53 and a horizontal angle adjustment component 54 with adjustment slots, a means to secure the horizontal adjustment component 54 in a pre-determined angle to the horizontal angle base component 53 wherein together the horizontal base component 53 and the horizontal angle adjustment component 54 form a horizontal adjustment section 53,54; (c) a fastening means to connect the horizontal adjustment section 53,54 to the vertical adjustment section 51,52 and form the AOM device 30; (d) a means to connect the vertical adjustment section 51,52 to a fuselage 59; and (e) a means to connect the horizontal adjustment section 53,54 to a motor 58 wherein the AOM device can be removably secured to a fuselage of the model airplane and readily adjusted to set the horizontal and vertical thrust angles of a propeller of the model airplane to easily correct flight direction and stabilize a flight pattern.

There is shown in FIGS. 1-12 a complete description and operative embodiment of the Adjustable Offset Mount (AOM) for engines of model airplanes device. In the drawings and illustrations, one notes well that the FIGS. 1-12 demonstrate the general configuration and use of this product. The various example uses are in the operation and use section, below.

The accompanying drawings, which are incorporated in and constitute a part of this specification, illustrate an embodiment of the Adjustable Offset Mount (AOM) 30 for engines of model airplanes device that is preferred. The drawings together with the summary description given above and a detailed description given below serve to explain the principles of the AOM 30. It is understood, however, that the AOM device 30 is not limited to only the precise arrangements and instrumentalities shown. Other examples of model airplane adjustable engine mounts as devices and uses are still understood by one skilled in the art of engine mounts and understood to be within the scope and spirit shown here.

FIGS. 1 A through 1 D are sketches of the general Adjustable Offset Mount (AOM) 30 for engines of model airplanes. Provided here are: an exploded view 31 of Adjustable Offset Mount (AOM) 30; a prototype 32 of AOM 30; an isometric assembly drawing 33 of prototype 32; a side or elevation view 34 of AOM 30; a top or plan view 35 of AOM 30; a vertical angle base component 51; a vertical angle adjustment component 52; a horizontal angle base component 53; a horizontal angle adjustment component 54; a power source 58 a fuselage/bulkhead/firewall 59; and a motor shaft 60 on engine 58 to mount propeller 80.

Figure 1B:
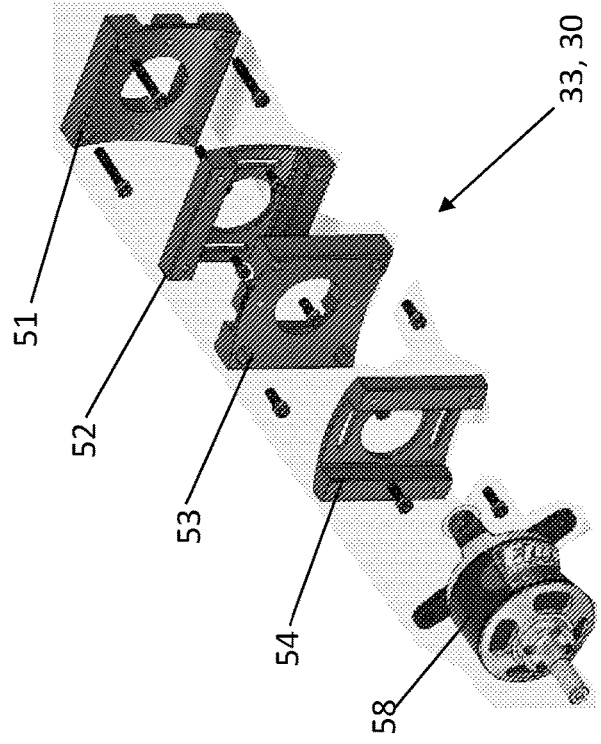
Figure 1D:
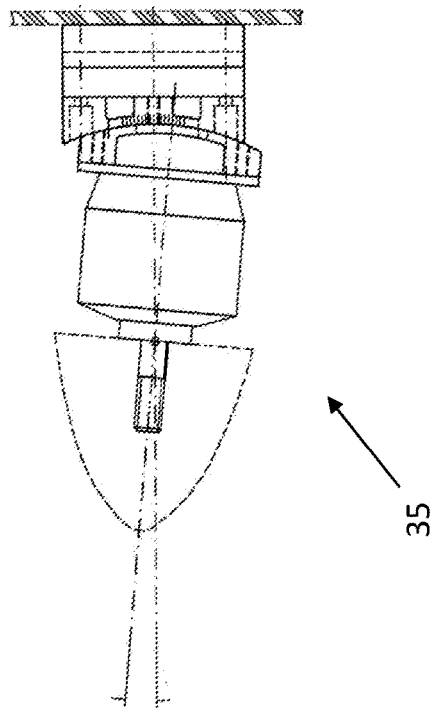
Figure 1A:
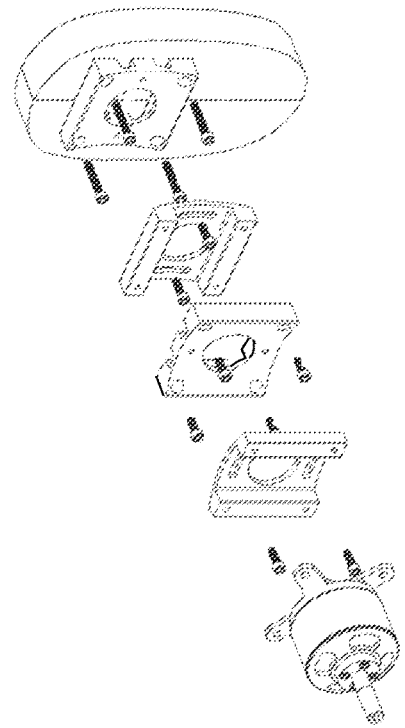
Figure 1C:
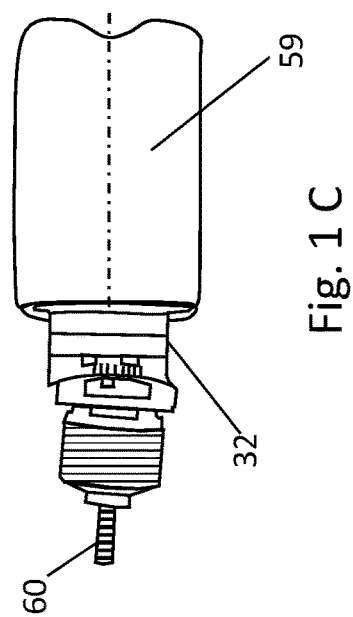
Figure 2:
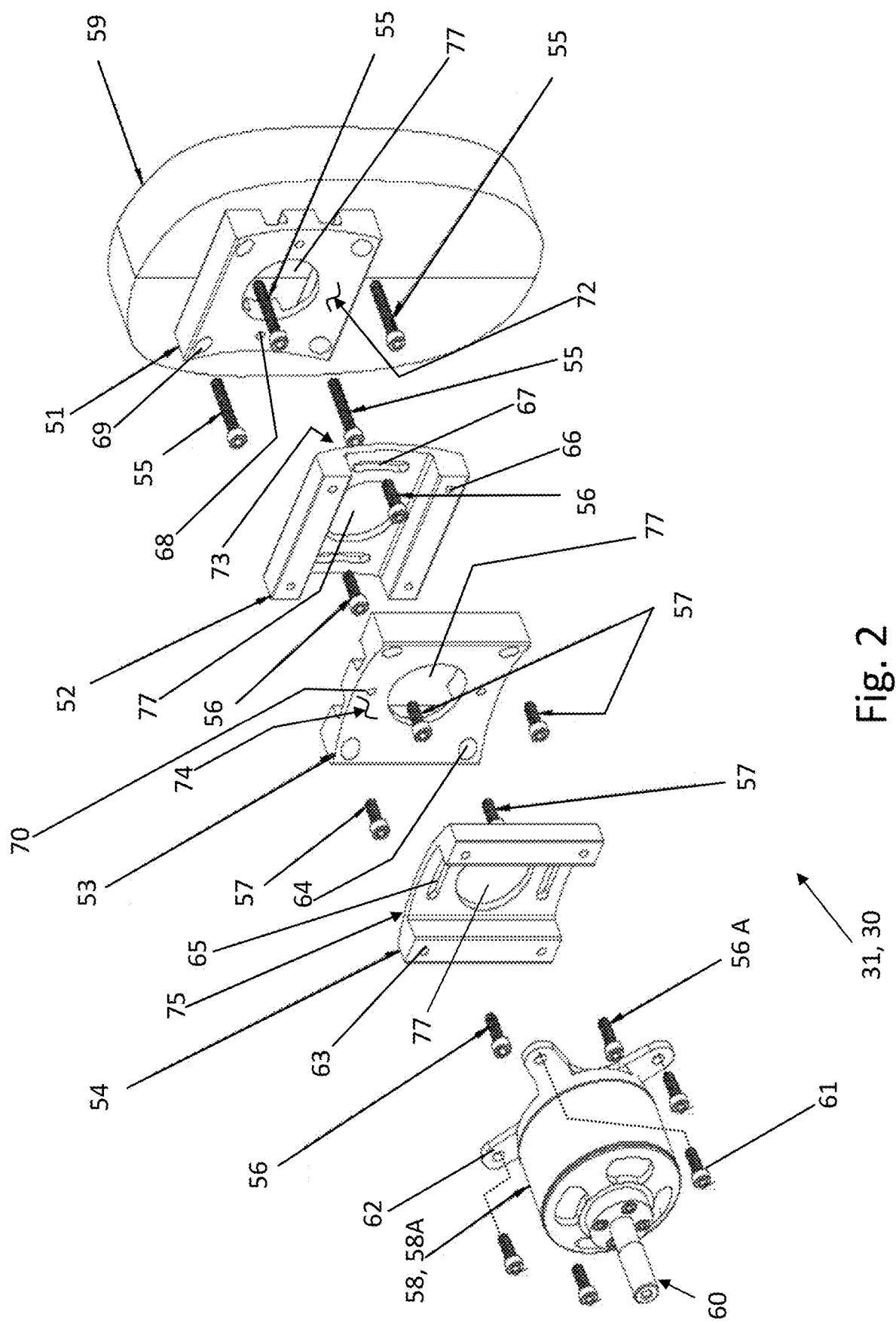
FIG. 2 is a sketch of an exploded view of Adjustable Offset Mount (AOM).

FIG. 2 is a sketch 31 of an exploded view of Adjustable Offset Mount (AOM) 30. Many of the features and components are shown here: an exploded view 31 of Adjustable Offset Mount (AOM) 30; a vertical angle base component 51; a vertical angle adjustment component 52; a horizontal angle base component 53; a horizontal angle adjustment component 54; a means for removably securing 55 vertical angle base component 51 to the fuselage bulkhead/firewall 59—such as extended fasteners—bolts, socket head machine bolts, friction clips, rivets, cotter pin and key, pin and spring ball, hot glue, etc.; a means for removably securing 56 vertical angle adjustment component 52 to the vertical angle base component 51 and means for removably securing 56A horizontal angle adjustment component 54 to the horizontal angle base component 53—such as socket head cap screws fasteners—bolts, socket head machine bolts, friction clips etc.; a means for removably securing 57 horizontal angle base component 53, 54 to vertical angle adjustment component 51, 52—such as socket head cap screws fasteners—bolts, socket head machine bolts, friction clips, rivets, cotter pin and key, pin and spring ball, hot glue, etc.; a power source 58—for example, an electric motor 58A, gas engine 58B, glow fuel motor 58C, nitro engine, or diesel engine; a fuselage/bulkhead/firewall 59; a motor shaft 60 on engine 58 to mount propeller 80; a means for removably securing 61 motor 58 through motor base aperture 62 to horizontal angle adjustment component 54 at threaded apertures 63 of component 54—such as socket head cap screws fasteners—bolts, socket head machine bolts, friction clips, rivets, cotter pin and key, pin and spring ball, hot glue, etc.; a motor base aperture 62; a threaded apertures 63 of horizontal angle adjustment component 54; a recess aperture 64 of the horizontal angle base component 53, apertures oversized to accept means for removably securing 57 into the threaded apertures 66 of the vertical angle adjustment component 52; an essentially horizontal pair of slotted aperture 65 of horizontal angle adjustment component 54 for removably and adjustably securing means for removably securing 56A [horizontal angle adjustment component 54 to the horizontal angle base component 53], the means 56 entering into the threaded apertures 70 of the horizontal angle adjustment component 53; a threaded apertures 66 of vertical angle adjustment component 52; an essentially vertical pair of slotted aperture 67 of vertical angle adjustment component 52 for removably and adjustably securing means for removably securing 56 [vertical angle adjustment component 52 to the vertical angle base component 51], the means 56 entering into the threaded apertures 68 of the vertical angle base component 51; a threaded apertures 68 of the vertical angle base component 51; a recess aperture 69 of the vertical angle base component 51, apertures oversized to accept means for removably securing 55 into the threaded apertures of the fuselage bulkhead 59; a threaded apertures 70 of horizontal angle base component 53; a concave curvature 72 on the vertical angle base component 51; a convex curvature 73 on the vertical angle adjustment component 52; a concave curvature 74 on the horizontal angle base component 53; a convex curvature 75 on the horizontal angle adjustment component 54; and an aperture 77 in each of AOM 30 base components 51,53 and adjustable components 52,53 to reduce weight of respective components. Also, if the measured length from the propeller back plate to the back face of the AOM is shorter than the distance from the propeller back plate to the firewall, then spacers, "stand offs", etc., can be required here also. Stand-off and spacers for this condition are known in the art by skilled model makers. The Adjustable Offset Mount (AOM) 30 is anticipated to be made from several different durable materials including, for example and not as a limitation, aluminum, steel, steel alloy, cast metals, pot metal, reinforced plastic, brass, tungsten, and composite material. The material may have a surface coating or finish such as plating, powdered metal, or paint.

Figure 3:
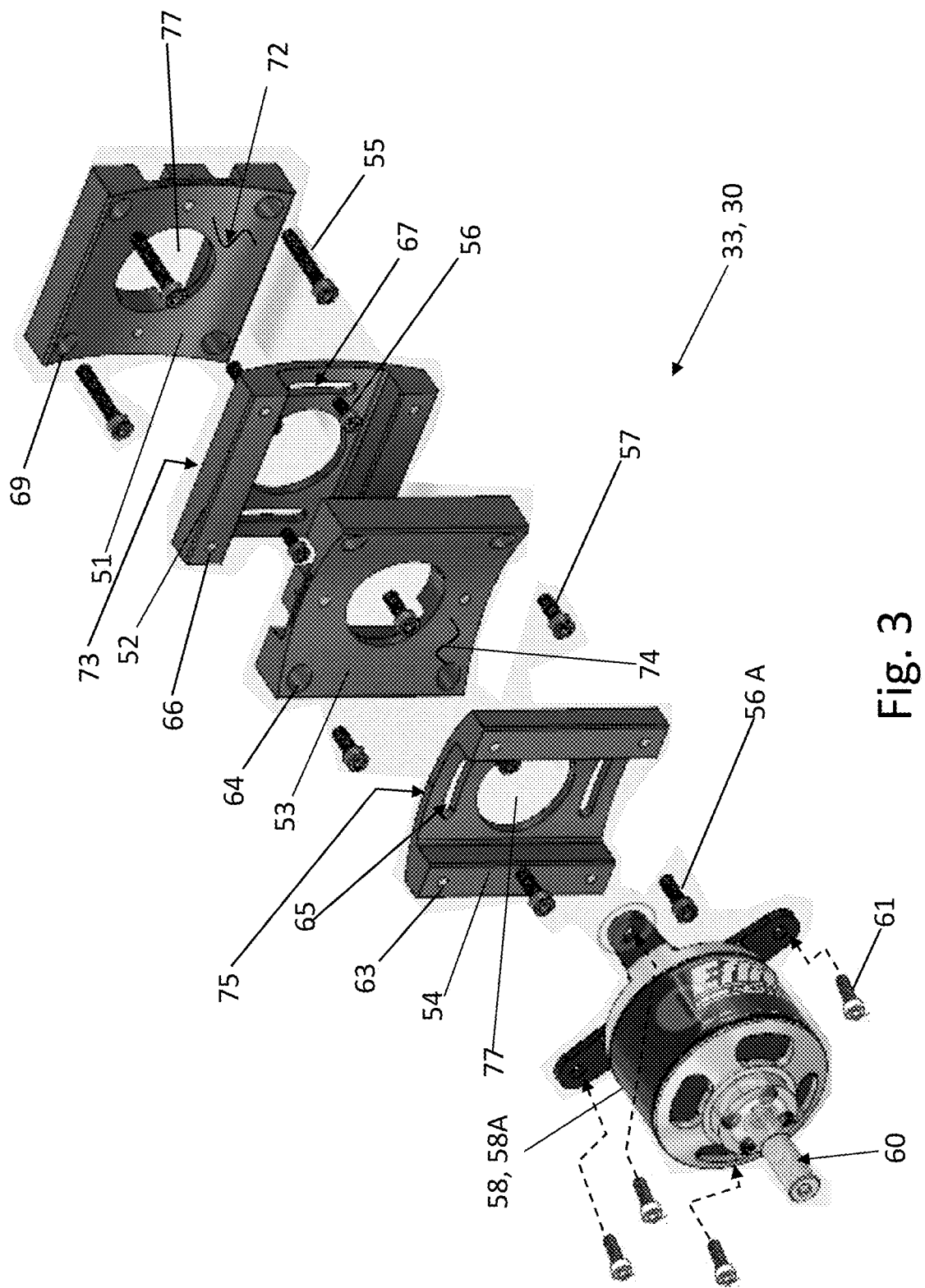
FIG. 3 is a sketch of an isometric assembly drawing of a prototype of the AOM shown from generally a top and angled downward view.

FIG. 3 is a sketch of an isometric assembly drawing 33 of a prototype 32 of the AOM 30 shown from generally a top and angled downward view. In this view is demonstrated: an isometric assembly drawing 33; a vertical angle base component 51; a vertical angle adjustment component 52; a horizontal angle base component 53; a horizontal angle adjustment component 54; a means for removably securing 55 vertical angle base component 51 to the fuselage bulkhead/firewall 59—such as extended fasteners—bolts, socket head machine bolts, friction clips, rivets, cotter pin and key, pin and spring ball, hot glue, etc.; a means for removably securing 56 vertical angle adjustment component 52 to the vertical angle base component 51 and means for removably securing 56 horizontal angle adjustment component 54 to the horizontal angle base component 53—such as socket head cap screws fasteners—bolts, socket head machine bolts, friction clips, rivets, cotter pin and key, pin and spring ball, hot glue, etc.; a means for removably securing 57 horizontal angle base component 53, 54 to vertical angle adjustment component 51, 52—such as socket head cap screws fasteners—bolts, socket head machine bolts, friction clips, rivets, cotter pin and key, pin and spring ball, hot glue, etc.; a power source 58—for example, an electric motor 58A, gas engine 58B, or glow fuel motor 58C; a fuselage/bulkhead/firewall 59; a motor shaft 60 on engine 58 to mount propeller 80; a means for removably securing 61 motor 58 through motor base aperture 62 to horizontal angle adjustment component 54 at threaded apertures 63 of component 54—such as socket head cap screws fasteners—bolts, socket head machine bolts, friction clips, rivets, cotter pin and key, pin and spring ball, hot glue, etc.; a motor base aperture 62; a threaded apertures 63 of horizontal angle adjustment component 54; a recess aperture 64 of the horizontal angle base component 53, apertures oversized to accept means for removably securing 57 into the threaded apertures 66 of the vertical angle adjustment component 52; an essentially horizontal pair of slotted aperture 65 of horizontal angle adjustment component 54 for removably and adjustably securing means for removably securing 56 [horizontal angle adjustment component 54 to the horizontal angle base component 53], the means 56 entering into the threaded apertures 70 of the horizontal angle adjustment component 53; a threaded apertures 66 of vertical angle adjustment component 52; an essentially vertical pair of slotted aperture 67 of vertical angle adjustment component 52 for removably and adjustably securing means for removably securing 56 [vertical angle adjustment component 52 to the vertical angle base component 51], the means 56 entering into the threaded apertures 68 of the vertical angle base component 51; a threaded apertures 68 of the vertical angle base component 51; a recess aperture 69 of the vertical angle base component 51, apertures oversized to accept means for removably securing 55 into the threaded apertures of the fuselage bulkhead 59; a threaded apertures 70 of horizontal angle base component 53; a concave curvature 72 on the vertical angle base component 51; a convex curvature 73 on the vertical angle adjustment component 52; a concave curvature 74 on the horizontal angle base component 53; a convex curvature 75 on the horizontal angle adjustment component 54; and an aperture 77 in each of AOM 30 base components 51,53 and adjustable components 52,53 to reduce weight of respective components.

FIGS. 4A through 4C are even more sketches of the isometric assembly drawing 33 of a prototype 32 of the AOM 30. These sketches show: an isometric assembly drawing 33; a vertical angle base component 51; a vertical angle adjustment component 52; a horizontal angle base component 53; a horizontal angle adjustment component 54; and a power source 58—for example, an electric motor 58A, gas engine 58B, or glow fuel motor 58C. One notes the other features were shown in FIG. 3. Also one can see that a vertical angle base component 51 and a vertical angle adjustment component 52 are the same as the horizontal angle base component 53 and the horizontal angle adjustment component 54 only turned ninety (90) degrees.

FIGS. 5 and 6 are sketches of component parts drawings of an AOM with features denoted. These are similar views but note the sizes are different. It should be noted, that the AOM system 30 is not just one engine mount, but a number of engine mounts, each designed to accommodate a specific range of engine sizes. Each of these FIGS. 5 and 6 drawings show the following components and features: a component part drawings 36 of parts 51, 52, 53, 54; an isometric assembly drawing 33; a vertical angle base component 51; a vertical angle adjustment component 52; a horizontal angle base component 53; a horizontal angle adjustment component 54; a threaded apertures 63 of horizontal angle adjustment component 54; a recess aperture 64 of the horizontal angle base component 53, apertures oversized to accept means for removably securing 57 into the threaded apertures 66 of the vertical angle adjustment component 52; an essentially horizontal pair of slotted aperture 65 of horizontal angle adjustment component 54 for removably and adjustably securing means for removably securing 56 [horizontal angle adjustment component 54 to the horizontal angle base component 53], the means 56 entering into the threaded apertures 70 of the horizontal angle adjustment component 53; a threaded apertures 66 of vertical angle adjustment component 52; an essentially vertical pair of slotted aperture 67 of vertical angle adjustment component 52 for removably and adjustably securing means for removably securing 56 [vertical angle adjustment component 52 to the vertical angle base component 51], the means 56 entering into the threaded apertures 68 of the vertical angle base component 51; a threaded apertures 68 of the vertical angle base component 51; a recess aperture 69 of the vertical angle base component 51, apertures oversized to accept means for removably securing 55 into the threaded apertures of the fuselage bulkhead 59; a threaded apertures 70 of horizontal angle base component 53; a concave curvature 72 on the vertical angle base component 51; a convex curvature 73 on the vertical angle adjustment component 52; a concave curvature 74 on the horizontal angle base component 53; a convex curvature 75 on the horizontal angle adjustment component 54; and an aperture 77 in each of AOM 30 base components 51,53 and adjustable components 52,53 to reduce weight of respective components. Also, a horizontal adjustment angle indicator 71 line scribed at zero (0) degrees to eight (8) degrees positive and negative adjustment indication; a horizontal/right thrust adjustment angle 71A; a line scribed 71B at zero (0) degrees base; a vertical adjustment angle indicator 76 a line scribed at zero (0) degrees to eight (8) degrees positive and negative adjustment indication; a vertical/down thrust adjustment angle 76A; and a line scribed 76B at zero (0) degrees base.

FIGS. 7 A and 7 B are third angle projections of an AOM 30 from a top or plan view 35 and a side or elevation view 34. The AOM 30 achieves the adjustment of the horizontal and vertical thrust by utilizing two separate curved planes of differing radii, one allowing adjustment from side to side, and the other allowing adjustment up and down. As a result of this arrangement, the AOM can be mounted on the centerline of the aircraft and the offset angles adjusted, while keeping both the centerline of the mount and the center point of the spinner back plate, on the centerline of the aircraft at all times. There is never a need to move the mount off the center line to compensate for any offset angle. The two curved planes are graduated with markings spaced one degree apart and covering a range of plus-or-minus, a minimum of ten degrees. By using this scale, it is possible through interpolation to achieve accuracies of ¼ degree, or less. The AOM is in fact infinitely adjustable, accuracy being limited only by the human eye. The Figure sketches demonstrate this and show: a side or elevation view 34 of AOM 30; a top or plan view 35 of AOM 30; a power source 58; a vertical angle base component 51; a vertical angle adjustment component 52; a horizontal angle base component 53; and a horizontal angle adjustment component 54. Note in the side view FIG. 7B that the AOM components a vertical angle base component 51 and a vertical angle adjustment component 52 which assemble to form an AOM vertical section 51, 52. This section is marked by a vertical adjustment angle indicator 76 line scribed at zero (0) degrees to eight (8) degrees positive and negative adjustment indication and a vertical/down thrust adjustment angle 76A and a line scribed 76B at zero (0) degrees base. In FIG. 7 A, the Plan view shows the horizontal angle base component 53 and the horizontal angle adjustment component 54 which assemble to form an AOM horizontal section 53, 54.

FIGS. 8 A through 8 C are three sketches to illustrate the problems associated with offsetting the engine relative to the centerline of the aircraft in both in horizontal and vertical directions. One notes the power source 58—for example a gas engine 58B or glow fuel motor 58C. FIGS. 9 A and 9 B are sketches of the benefits to the AOM when offsetting the engine relative to the centerline of the aircraft in both in horizontal and vertical direction. One notes the relationship of the cowling 79 attached/integral over propeller 80 and shaft 60 to the top or plan view 35 of AOM 30. FIGS. 10 A through 10 C are sketches of prototype AOMs mounted to the fuselage and the motor of the model airplanes. These sketches are all described in the Operations Section.

FIGS. 11 A through 11 D and FIGS. 12 A through 12 D are sketches of prior art attempts to improve adjustable mountings for model airplanes. Here former patents and applications for various motor mount devices are shown. These include: a prior art 81 is U.S. Pat. No. 4,249,711; a prior art 82 is U.S. Pat. No. 6,779,755; a prior art 83 is U.S. Pat. No. 5,505,423; a prior art 84 is an existing motor mount with a fixed adjustment "built in"; a prior art 85 model motor on a 4 rod adjustment mount—awkward adjustment and no angle measurements; a prior art 86 model motor with a bendable sheet metal mount (no control over adjustment size); a prior art 87 is a built in adjustment; and a prior art 88 is a model motor on a 4 rod adjustment mount with various sized spacers—again awkward adjustment and no angle measurements. As can be seen, the Adjustable Offset Mount (AOM) for engines of model airplanes device is a unique combination and use as described herein.

The details mentioned here are exemplary and not limiting. Other specific components and manners specific to describing an Adjustable Offset Mount (AOM) 30 for engines of model airplanes may be added as a person having ordinary skill in the field of the art of model airplane engine mounting devices and their uses well appreciates.

OPERATION OF THE PREFERRED EMBODIMENT

The Adjustable Offset Mount (AOM) 30 for engines of model airplanes has been described in the above embodiment. The manner of how the device operates is described below. One notes well that the description above and the operation described here must be taken together to fully illustrate the concept of the Adjustable Offset Mount (AOM) 30 for engines of model airplanes. The preferred embodiment of an Adjustable Offset Mount (AOM) is a shim-less and an Adjustable Offset Mount (AOM) device 30 for engines of a model airplane, the device is comprised of: (a) a vertical angle base component 51 and a vertical angle adjustment component 52 with adjustment slots, a means to secure the vertical adjustment component 52 in a pre-determined angle to the vertical angle base component 51 wherein together the vertical base component and vertical angle adjustment component form a vertical adjustment section 51,52; (b) a horizontal angle base component 53 and a horizontal angle adjustment component 54 with adjustment slots, a means to secure the horizontal adjustment component 54 in a pre-determined angle to the horizontal angle base component 53 wherein together the horizontal base component 53 and the horizontal angle adjustment component 54 form a horizontal adjustment section 53,54; (c) a fastening means to connect the horizontal adjustment section 53,54 to the vertical adjustment section 51,52 and form the AOM device 30; (d) a means to connect the vertical adjustment section 51,52 to a fuselage 59; and (e) a means to connect the horizontal adjustment section 53,54 to a motor 58 wherein the AOM device can be removably secured to a fuselage of the model airplane and readily adjusted to set the horizontal and vertical thrust angles of a propeller of the model airplane to easily correct flight direction and stabilize a flight pattern.

The Adjustable Offset Mount (AOM) 30 for engines of model airplanes operates with ease and simplicity yet with superior accuracy. The object of the AOM, 30 is to allow the engine mounting system to be attached to the firewall/fuselage 59 of the model airplane so that the centerline of the electric motor/glow fuel powered engine/gas powered engine, is directly on the centerline of the airplane, without any deviation, horizontally or vertically. Once attached to the firewall/fuselage 59 in this manner, the AOM 30 then allows horizontal and vertical thrust angle offsets to be "dialed in", keeping the center point of the propeller 80 mounting face, and therefore the center point of the spinner back plate, on the centerline of the airplane at all times. Accommodation is made, via graduations (on the vertical adjustment angle indicator 76 line scribed at zero (0) degrees to eight (8) degrees positive and negative adjustment indication and horizontal adjustment angle indicator 71 line scribed at zero (0) degrees to eight (8) degrees positive and negative adjustment indication) on the AOM 30, to adjust the offset angles in one degree increments. However, through interpolation, one half, or even one quarter degree adjustments can easily be achieved.

Each engine mount works on the same principal of two curved surfaces, the radii of which are specific to that size of engine mount. The first curved surface, comprising two mating components [horizontal angle base component 53 and horizontal angle adjustment component 54], allows left and right (horizontal) adjustment of the engine thrust line. Likewise the second curved surface also comprises of two mating components [vertical angle base component 51 and vertical angle adjustment component 52], but is 90 degrees opposed to the first curved surface thereby allowing up and down (vertical) adjustment of the engine thrust line. If no vertical offset of the power unit is required, only the front two components need be used, thereby saving space and/or weight. As stated, each engine mount is designed to accommodate a variety of engine sizes. The radii (concave 72, 74 and convex surfaces 73, 75) of each pair of the components that mount are set up so that the largest engine it will accommodate will be bolted directly to the front face of the AOM 30, using the correct adapter plate. It is imperative to the correct function of the AOM 30, that a specific dimension, from the propeller back plate to the front mounting face of the AOM, be maintained at all times. Therefore, any engine of a smaller size will require spacers to make up the difference. Also, if the measured length from the propeller back plate to the back face of the AOM is shorter than the distance from the propeller back plate to the firewall, then spacers, "stand off's", etc., will be required here also.

It is anticipated that a chart will be available online via the internet, that will determine the correct amount of spacing required for most available electric motors. Formulae will be given to calculate the same for other types of engine. Once the AOM 30 is installed in this manner, loosening two socket head cap screws, adjusting the thrust angle and tightening them back up is all that is required. No more having to re-drill holes, in order to move the engine mount further off the centerline of the airplane. And, no more differential calculus to determine the number of washers required and where to put them. With the use of the correct adapter, most types of model airplane engine can be mounted to the airplane using the AOM 30. This includes electric, gas powered and glow fuel powered, but excludes jet engines and electric ducted fan (EDF) engines. It should be noted, that the AOM system 30 is not just one engine mount, but a number of engine mounts, each designed to accommodate a specific range of engine sizes.

FIGS. 8A through 8C are three sketches to illustrate the problems associated with offsetting the engine relative to the centerline of the aircraft in both in horizontal and vertical directions. Shown are: a down thrust/vertical mount adjustment 91 typical with shimming; a side thrust/horizontal mount adjustment 92 typical with shimming; and another side thrust/horizontal mount adjustment 93 typical with shimming. These three drawings illustrate the problems associated with offsetting the engine relative to the centerline of the aircraft, both in horizontal and vertical directions. Note the ⅛" thick plywood shim, under the left leg of the mount to give a right thrust angular displacement of 3½ degree. If it is decided that 4 degree are needed, how thick is the plywood shim then? One can calculate that and sand down another shim to whatever thickness to get the additional ½ degree, but then once one has it, he has once again moved the center of the prop off the centerline of the aircraft. Now he has to move the whole of the engine and mount assembly to the left to compensate and bring it back in line. For ½ degree, or even 1 degree, he is probably looking at moving the mounting bolts less than a hole width. How does one drill a ½ a hole? Better yet, why mess with this issue in the first place, go buy an AOM 30!!!

FIGS. 9A and 9B are sketches of the benefits to the AOM 30 when offsetting the engine 58 relative to the centerline of the aircraft in both in horizontal and vertical direction. Shown are the a vertical angle base component 51; a vertical angle adjustment component 52; a horizontal angle base component 53; a horizontal angle adjustment component 54; the AOM Horizontal Adjustment Section 53,54; the AOM Vertical Adjustment Section 51, 52; a fuselage/bulkhead/firewall 59; a vertical adjustment angle indicator 76 line scribed at zero (0) degrees to eight (8) degrees positive and negative adjustment indication; a vertical/down thrust adjustment angle 76A of deflection; a horizontal adjustment angle indicator 71 line scribed at zero (0) degrees to eight (8) degrees positive and negative adjustment indication; and a horizontal/right thrust adjustment angle 71A of deflection. Here one sees how the center point of the spinner/propeller 80 back plate stays on the centerline of the airplane, regardless of the angle of deflection.

FIGS. 10A through 10C are sketches of prototype 32 AOMs 30 mounted to the fuselage 59 and the motor 58 of the model airplanes. Shown here are: a prototype 32 of AOM 30 —comprised of assembled components 51, 52, 53, 54; a power source 58—for example, an electric motor 58A, gas engine 58B, or glow fuel motor 58C; a fuselage/bulkhead/firewall 59; a motor shaft 60 on engine 58 to mount propeller 80; a horizontal adjustment angle indicator 71 line scribed at zero (0) degrees to eight (8) degrees positive and negative adjustment indication; and a vertical adjustment angle indicator 76 line scribed at zero (0) degrees to eight (8) degrees positive and negative adjustment indication. These views show the motor mounted in a 3D drawing showing the motor mounted with offset angles of 4 degrees right and 4 degrees down initiated (up, down, left of right). One can clearly see the adjustment graduations which are at 1-degree increments, spaced 8 degrees either side of the larger zero degree mark.

With this description it is to be understood that the Adjustable Offset Mount (AOM) 30 for engines of model airplanes is not to be limited to only the disclosed embodiment of product. The features of the AOM device 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. An Adjustable Offset Mount (AOM) and a shim-less device (30) for an engine of a model airplane, the device is made of durable materials and comprised of:
    (a) a vertical angle base component (51) and a vertical angle adjustment component (52) with adjustment slots, a means for removably securing (56) the vertical adjustment component (52) in a pre-determined angle to the vertical angle base component (51) wherein together the vertical base component and vertical angle adjustment component form a vertical adjustment section (51), (52);
    (b) a horizontal angle base component (53) and a horizontal angle adjustment component (54) with adjustment slots, a means (56A) for securing the horizontal adjustment component (54) in a pre-determined angle to the horizontal angle base component (53) wherein together the horizontal base component (53) and the horizontal angle adjustment component (54) form a horizontal adjustment section (53), (54);
    (c) a means (57) for fastening and connecting the horizontal adjustment section (53), (54) to the vertical adjustment section (51), (52) and form the AOM device (30);
    (d) a means (55) for connecting the vertical adjustment section (51), (52) to a fuselage (59); and
    (e) a means (61) for connecting the horizontal adjustment section (53), (54) to a motor (58);
wherein the AOM device when connected to the engine and a propeller can be removably secured to a fuselage of the model airplane and readily adjusted to set the horizontal and vertical thrust angles of the propeller of the model airplane to easily correct flight direction and stabilize a flight pattern.

2. The Adjustable Offset Mount (AOM) and a shim-less device (30) claim 1 wherein the durable material of the device is selected from a group consisting of an aluminum, a steel, a steel alloy, a cast metal, a pot metal, a reinforced plastic, a brass, a tungsten, and a composite material.

3. The Adjustable Offset Mount (AOM) and a shim-less device (30) claim 2 wherein the durable material of the device is further comprised of a surface coating.

4. The Adjustable Offset Mount (AOM) and a shim-less device (30) claim 3 wherein the surface coating is selected from a group consisting of a plating, a powdered metal, and a paint.

5. The Adjustable Offset Mount (AOM) and a shim-less device (30) claim 1 wherein the means for removably securing (55) vertical angle base component (51) to the fuselage bulkhead/firewall (59) is selected from a group consisting of bolts, socket head machine bolts, friction clips, rivets, cotter pin and key, pin and spring ball, and hot glue.

6. The Adjustable Offset Mount (AOM) and a shim-less device (30) claim 1 wherein the means for removably securing (56) vertical angle adjustment component (52) to the vertical angle base component (51) is selected from a group consisting of socket head cap screws fasteners bolts, socket head machine bolts, friction clips, rivets, cotter pin and key, pin and spring ball, and hot glue.

7. The Adjustable Offset Mount (AOM) and a shim-less device (30) claim 1 wherein the means for removably securing (56A) horizontal angle adjustment component (54) to the horizontal angle base component (53) is selected from a group consisting of socket head cap screws fasteners bolts, socket head machine bolts, friction clips, rivets, cotter pin and key, pin and spring ball, and hot glue.

8. The Adjustable Offset Mount (AOM) and a shim-less device (30) claim 1 wherein the means for removably securing (57) horizontal angle base component (53), (54) to vertical angle adjustment component (51), (52) is selected from a group consisting of socket head cap screws fasteners bolts, socket head machine bolts, friction clips, rivets, cotter pin and key, pin and spring ball, and hot glue.

9. The Adjustable Offset Mount (AOM) and a shim-less device (30) claim 1 wherein the means for removably securing (61) motor (58) through motor base aperture (62) to horizontal angle adjustment component (54) at threaded apertures (63) of component (54) is selected from a group consisting of socket head cap screws fasteners, bolts, socket head machine bolts, friction clips, rivets, cotter pin and key, and pin and spring ball.

10. The Adjustable Offset Mount (AOM) and a shim-less device (30) claim 1 wherein the engine connected to the device is selected from a group consisting of an electric motor (58A), a gas engine (58B), a glow fuel motor (58C), a nitro engine, and a diesel.

11. An Adjustable Offset Mount (AOM) and a shim-less device (30) for an engine of a model airplane, the device is made of aluminum and comprised of:
  (a) a vertical angle base component (51) and a vertical angle adjustment component (52) with adjustment slots, a set of socket head cap screws for securing the vertical adjustment component (52) in a pre-determined angle to the vertical angle base component (51) wherein together the vertical base component and vertical angle adjustment component form a vertical adjustment section (51), (52);
  (b) a horizontal angle base component (53) and a horizontal angle adjustment component (54) with adjustment slots, a set of socket head cap screws for securing the horizontal adjustment component (54) in a pre-determined angle to the horizontal angle base component (53) wherein together the horizontal base component (53) and the horizontal angle adjustment component (54) form a horizontal adjustment section (53), (54);
  (c) a set of socket head cap screws for fastening and connecting the horizontal adjustment section (53), (54) to the vertical adjustment section (51), (52) and form the AOM device (30);
  (d) a set of socket head cap screws for connecting the vertical adjustment section (51), (52) to a fuselage (59); and
  (e) a set of socket head cap screws for connecting the horizontal adjustment section (53), (54) to a motor (58) wherein the AOM device when connected to the engine and a propeller can be removably secured to a fuselage of the model airplane and readily adjusted to set the horizontal and vertical thrust angles of the propeller of the model airplane to easily correct flight direction and stabilize a flight pattern.

12. The Adjustable Offset Mount (AOM) and a shim-less device (30) claim 11 wherein the aluminum material of the device is further comprised of a surface coating.

13. The Adjustable Offset Mount (AOM) and a shim-less device (30) claim 11 wherein the surface coating is selected from a group consisting of a plating, a powdered metal, and a paint.

* * * * *